United States Patent

Naono

[15] 3,637,310

[45] Jan. 25, 1972

[54] LIQUID CHROMATOGRAPH FOR IDENTIFYING CHEMICAL COMPONENTS BY MEANS OF SPECTROMETER

[72] Inventor: Toyohiko Naono, Tokyo, Japan

[73] Assignee: Nihon Denshi Kabushiki Kaisha, Tokyo, Japan

[22] Filed: Mar. 26, 1970

[21] Appl. No.: 22,949

[30] Foreign Application Priority Data

Apr. 1, 1969    Japan..................................44/25120

[52] U.S. Cl..................................356/83, 356/88, 356/96
[51] Int. Cl..........................................G01j 3/42
[58] Field of Search..........................356/74, 83, 84, 88, 98

[56] References Cited

UNITED STATES PATENTS 3,287,557   11/1966   Bartz.....................................356/74
3,377,467   4/1968   Staunton et al.........................356/74

Primary Examiner—Ronald L. Wibert
Assistant Examiner—V. P. McGraw
Attorney—Webb, Burden, Robinson & Webb

[57] ABSTRACT

A liquid chromatograph and a method of chromatography for identifying sample components eluated from a chromatographic column. The sample components are passed through a sample cell which is pervious to a pencil of rays whose wavelength is scanned repeatedly by means of a dispersing element forming part of a spectrometer. The sample components are precisely identified by reading an absorption spectrum formed by scanning the wavelength of the pencil of rays, and by plotting a chromatogram in accordance with the signals corresponding to a certain specified wavelength of the scanning range.

5 Claims, 4 Drawing Figures

PATENTED JAN 25 1972 3,637,310

INVENTOR.
TOYOHIKO NAONO
BY
Webb Burden Robinson & Webb

LIQUID CHROMATOGRAPH FOR IDENTIFYING CHEMICAL COMPONENTS BY MEANS OF SPECTROMETER

This invention relates to a liquid chromatograph and a method of chromatography for identifying chemical components by means of a spectrometer.

In conventional liquid chromatography, sample components eluated from a chromatographic column pass through a sample cell which is pervious to a pencil of rays having a constant wavelength. A detector then measures the absorption degree of the pencil of rays as they pass through the sample cell, and a recorder records a chromatogram in accordance with the signal detected by the detector. In order to precisely identify the sample components corresponding to the required peak or peaks within the spectrum, the sample components eluating from the column are either quantitatively or periodically collected in fraction tubes by means of a fraction collector. The positions within the chromatogram corresponding to the respective collected sample components are ascertained by means of a marker interlocked with the recorder and the sample components collected in the fraction tubes are then identified by reading the absorption spectra recorded by an ultraviolet, visible or infrared spectrometer. Suffice to say, there are certain inherent drawbacks associated with the above-described method. These include, troublesome and time consuming manipulations in order to identify the sample components.

My invention provides a novel liquid chromatograph and a method of chromatography which overcomes these inherent defects. My invention provides for sample components eluating from a chromatographic column to be identified by an ultraviolet, visible or infrared spectrometer whole dispersing element rotates or swings in order to repeatedly scan the wavelength of a pencil ray which pass through a pervious cell containing sample components. The absorption spectrum of the sample components is continuously recorded, and moreover, the chromatogram is obtained by plotting all the absorption degree values measured at a certain specified wavelength within the sweep range.

The features and advantages of the invention will become more apparent after reading through the following specification in conjunction with the accompanying drawings, wherein.

Figure 1:
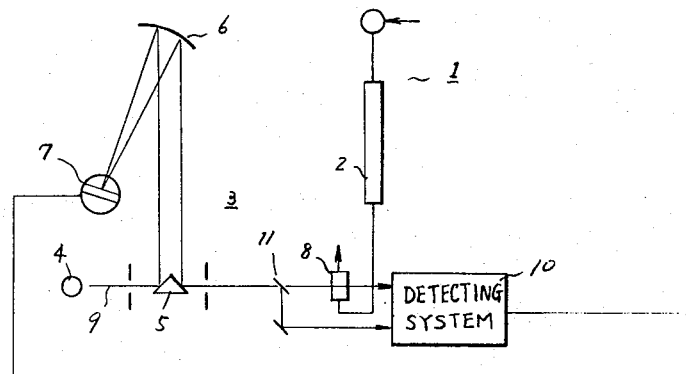
FIG. 1 is a block diagram of a typical liquid chromatograph showing one embodiment of the present invention in which a spectrometer is used for identifying the sample components eluating from a chromatographic column.

Referring now to FIG. 1, a liquid chromatograph generally designated 1 includes a chromatographic column 2 and a spectrometer 3. The spectrometer includes a light source 4 which directs light through a slit to prism 5. Prism 5 reflects the pencil of rays to concave mirror 6 which, in turn, reflects the rays to dispersing element 7 which rotates to continually scan the pencil of rays being reflected from mirror 6. The dispersing element then reflects the rays back to the concave mirror 6 and prism 5. The rays then go through another slit to half-mirror 11. Half-mirror 11 divides the pencil of rays into two equally luminous rays, one of which is detected by a detecting system 10 after passing through the sample cell 8 fed by the chromatographic column 2 and located at a focusing point, the other being used for reference purposes.

Figure 2:
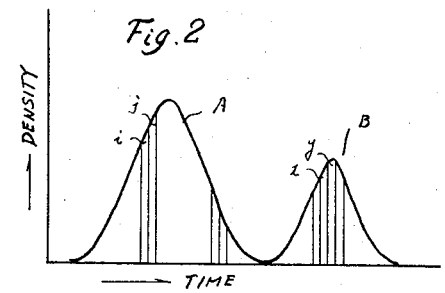
FIG. 2 is a diagram for explaining the present invention.

Let us suppose that the sample components eluating from the chromatographic column 2 separate into two components A and B, as shown in FIG. 2, and that the two components are applied to the sample cell 8 in turn. Under this condition, the ray which passes through the sample cell 8 loses some of its energy, the amount lost depending upon the absorption degree of the sample component in question. In other words, a difference exists between the energy level of the reference ray and that of the ray having passed through the sample component, the difference being detected by a detecting system 10 in the form of electric current and recorded by a recorder 12 as an absorption spectrum.

Figure 3:
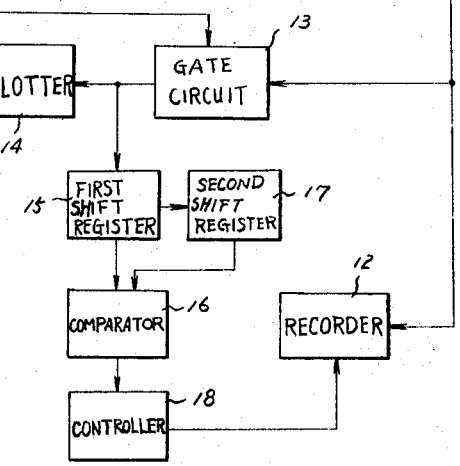
FIG. 3 shows an absorption spectrum recorded by the embodiment described in FIG. 1; and, FIG. 4 is a chromatogram plotted in accordance with the absorption degree of the sample components eluating from the column.
Figure 3:
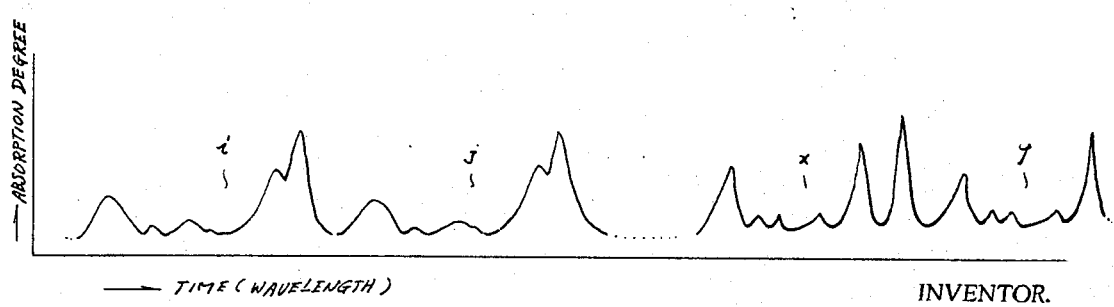

The spectrum is recorded, as shown in FIG. 3, in accordance with the changes in absorption degree of the sample components of the pencil of rays which are repeatedly scanned by the dispersing element 7. Explaining in further detail, the chromatogram is sampled as shown in FIG. 2, the sampling taking place at fixed periods determined by the time it takes for the dispersing element 7 to complete one rotation or swing. In this way, the absorption spectrum is successively recorded. The two adjacent absorption spectra A and B, shown in FIG. 2, are alike in shape but slightly differ in height, the difference in height be proportional to the density of the sample component. FIG. 3 shows a partial absorption spectrum corresponding to the $i$ and $j$ positions of the sample component A and the $x$ and $y$ positions of the sample component B only, the other positions being omitted to avoid duplication.

Figure 4:
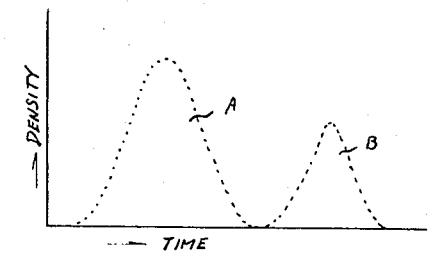

The dispersing element 7 is provided with a switching means for selecting a specific wavelength in order to detect the absorption degree at the selected wavelength. When the dispersing element arrives at a position where the selected wavelength (e.g., 570 m$\mu$) is reflected into the concave mirror 6, the dispersing element supplies pulses to a gate circuit 13, at which time, the gate circuit 13 detects the plot signals form the detecting system 10, which are in turn plotted by a plotter 14, as shown in FIG. 4. Therefore, the absorption spectrum is obtained for a given wavelength when the dispersing element picks up that wavelength and transmits the pulse to the gate circuit.

It is also possible to have the recorder 12 record the absorption spectrum by means of the spectrometer 3 only when the plotted chromatogram reaches a peak point. This is accomplished as follows. Referring again to FIG. 1, the plot signals from the gate circuit 13 are applied to the plotter 14 and plotted. The plot signals are simultaneously applied to a first shift register 15 which memorizes the first incoming signal and supplies it to a comparator 16. The second plot signal is then applied to the first shift register 15 and is similarly memorized and supplied to comparator 16. The previously memorized first signal is then applied to a second shift register 17 and again memorized and supplied to the comparator 16. The comparator 16 then supplies a controller 18 with the peak signal or signals detected by the comparator 16 when the difference in the two memorized signals, obtained by subtracting the intensity of the second signal from the first signal, changes from plus to minus. At that time, the controller 18 supplies the recorder 12 with a control signal or signals, upon which the recorder 12 commences to operate for a given period of time, and then stops automatically. In this way, the recorder 12 records the absorption spectra at only the peak point or points in the chromatogram.

From the foregoing description, it will be readily appreciated that this invention provides a method and apparatus which can simultaneously record the absorption spectra by means of the recorder 12 and the chromatogram by means of the plotter 14 and that sample components eluating from the chromatographic column are identified by reading the absorption spectra.

I claim:

1. A liquid chromatograph comprising a chromatographic column and a spectrometer, the spectrometer including a sample cell communicating with said chromatographic column for passing through sample components eluated from said chromatographic column, a light source for emitting a pencil of rays through said sample cell, a dispersing element having means to repeatedly scan the wavelength of the pencil of rays to select desired wavelengths, a means for detecting signals corresponding to an absorption degree of the sample component for the pencil of rays, a gate circuit communicating with said detecting means and dispersing element to pass through said signals corresponding to said desired wavelengths, a plotter communicating with the gate circuit for plotting sad signals passed therethrough, circuit means communicating with said gate circuit for detecting peak signals of said signals passed through the gate circuit, and a recorder communicating with said detecting means and said circuit means to record the signals corresponding to an absorption degree in a period of time when said circuit means detects peak signals.

2. The chromatograph of claim 1 wherein the spectrometer includes a prism to reflect the pencil of rays from the light source to a concave mirror, said concave mirror reflecting the pencil of light to the dispersing element said concave mirror then receiving the pencil of light rays back from the dispersing element and deflecting them to said prism, said prism then reflecting the pencil of rays to said sample cell.

3. The chromatograph of claim 1 wherein the detecting means includes a half-mirror which divides the pencil of rays into two equally luminous rays, the first of which passes through the sample cell and the second of which is a reference to determine the absorptivity of the first rays by the sample components.

4. The chromatograph of claim 1 wherein the circuit means includes a first shift register communicating with said gate circuit for memorizing first and second of said signals, a second shift register communicating with said first shift register to memorize said first signals, a comparator communicating with the first and second shift register to compare the intensity of said memorized first and second signals, a controller communicating with the comparator and the recorder, said controller responsive to start the recorder for a predetermined time when the comparator output changes in sign in response to a peak in the chromatogram.

5. A method of identifying sample components eluated from a chromatographic column through a sample cell comprising emitting a pencil of rays from a light source through said sample cell, scanning said pencil of rays with a dispersing element to choose a selected wavelength, detecting the absorption degree of the sample for the selected wavelength, recording an absorption spectrum from the absorption degree, plotting a chromatogram of the sample component, and recording the absorption spectrum at a peak point of the plotted chromatogram.

* * * * *